July 13, 1965     W. C. RIESTER     3,194,263
RESILIENT MATERIAL CHECK VALVE
Filed Aug. 27, 1962
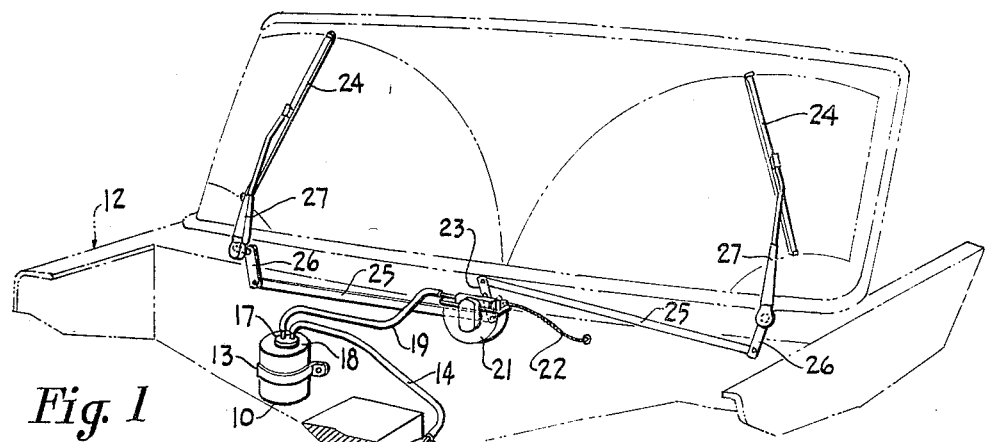
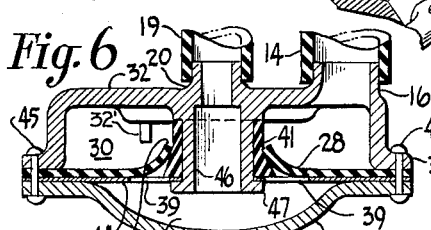
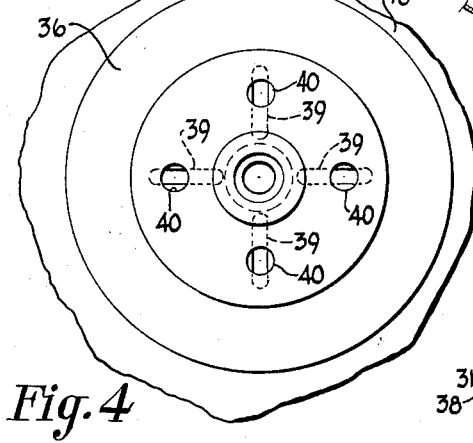
INVENTOR.
WILLIAM C. RIESTER
BY E. Herbert Liss
ATTORNEY

United States Patent Office 3,194,263
Patented July 13, 1965

3,194,263
RESILIENT MATERIAL CHECK VALVE
William C. Riester, Williamsville, N.Y., assignor to Trico Products Corporation, Buffalo, N.Y.
Filed Aug. 27, 1962, Ser. No. 219,465
3 Claims. (Cl. 137—508)

The present invention relates to an improved fluid storage unit, and more particularly, to an automatic self-sealing diaphragm-type valve for fluid pressure storage containers.

Fluid storage units of this type are widely used as auxiliary reserve tanks in a closed circuit system for fluid pressure operated devices. Such systems are used extensively in conjunction with internal combustion engines where, by way of example, the depression in the intake manifold is utilized to provide a source of differential pressure. This differential pressure is harnessed to operate fluid pressure responsive servos. These servos may be used for locking and unlocking of latches for car doors and rear deck lids. Examples of other uses include operation of remotely located controls for heater systems and for fluid pressure motors for windshield wiper and washer systems.

Auxiliary fluid storage containers for the above mentioned purposes are advantageous in that they assure functioning of the fluid pressure operated devices during periods of fluctuation of the vacuum in the intake manifold. As an example, the fluctuation of vacuum in the manifold is substantially nullified during periods of wide open engine throttle. Such storage tanks also make it possible to operate some of these devices when the engine is not running.

Although this invention is herein described for use specifically in conjunction with an automobile engine intake manifold and utilized for operating fluid operated devices on an automobile, it will, of course, be understood that, in its broader aspects, the auxiliary fluid storage tanks may be utilized for other and different purposes. It should also be understood that the particular valve herein described in combination with the fluid pressure storage units, in accordance with the broader aspects of this invention, may be utilized in other and different devices and systems.

To seal these fluid storage containers or tanks during periods of low manifold vacuum, various types of check valves are commonly used as, for example, ball type and flap type. These valves are relatively expensive and result in complex assembly operations. Furthermore, they provide relatively great resistance to flow and the consequent undesirable pressure drop. Prior art types of check valves are relatively sluggish in operation. Furthermore, these prior art check valves are relatively sluggish in operation because a relatively small valve area is exposed to differential pressure. They are also subject to clogging by impurities in the fluid which deposit on the working parts, thereby producing leakage.

The principal object of the present invention, therefore, is to provide an improved storage tank unit which is economical, of relatively simple construction and includes improved sealing means.

Another object of the invention is to provide an improved fluid storage unit which utilizes an automatic self-sealing check valve for fluid pressure storage containers which is responsive to differential pressure and includes a diaphragm having a relatively large exposed area to differential pressure, thereby resulting in more rapid and better sealing of the fluid pressure storage container.

Another object of the present invention is to provide a valve construction for a pressure storage container which provides a substantially instantaneous response whenever it is subjected to pressure differentials.

A further object of the present invention is to provide a valve construction for fluid storage containers wherein the pressure differential can act on a relatively large area of the valve portions of the valve assembly and therefore provide a relatively high total force for actuating such valve portions, the foregoing action overcoming the inertia of the operating components of the valve and further contributing toward the instantaneous action which the valve produces.

Still another object of the present invention is to provide an improved check valve construction wherein the sealing surfaces are self-cleaning with the attendant result that the check valve is not readily susceptible to clogging and leakage resulting therefrom.

Other objects and advantages of the invention will be apparent from the following detailed description taken in connection with the accompanying drawings wherein:

FIG. 1 is a fragmentary perspective view of an automotive vehicle mounting a vacuum tank containing the improved check valve structure of the present invention;

FIG. 2 is a fragmentary cross sectional view of the improved check valve structure of FIG. 1 in a position wherein it prevents communication between the conduits associated therewith;

FIG. 3 is a cross sectional view similar to FIG. 2 but showing the condition of the check valve structure when it permits communication between the conduits associated therewith;

FIG. 4 is a fragmentary plan view taken in the direction of line IV—IV of FIG. 2;

FIG. 5 is a cross sectional view of a modified type of check valve structure similar to the construction of FIGS. 2–4; and FIG. 6 is a cross sectional view of a still further modified type of check valve structure which can be used as an entity by itself.

Briefly, the invention is shown for use, by way of example, in a vacuum operated windshield wiper system. A vacuum is supplied for a windshield wiper motor from the intake manifold of a motor vehicle through the storage unit of this invention which includes a fluid storage container having an inlet port connected with the manifold and an outlet port connected to the windshield wiper motor. The inlet port communicates with a chamber of the valve assembly in the fluid storage unit and the outlet port extends through the chamber to the fluid storage container. The outlet port is shown as a tubular conduit centrally located in the chamber and extending through the chamber to the fluid storage container. The chamber communicates with the fluid storage tank through openings in the bottom wall thereof. A resilient diaphragm-type closure wall is disposed within the chamber and has a perforated area surrounding the tubular outlet port and of smaller diameter than the outer diameter of the outlet port. The tubular outlet port has a valve seat surface and is adapted to cooperate with the perforated area of the diaphragm to provide tight sealing engagement between the inlet port and a fluid storage container or reservoir when the pressure in the tank is of lower value than the pressure in the intake manifold. When the pressure in the tank exceeds the pressure in the intake manifold, the large area of the diaphragm exposed to differential pressure results in stretching of the perforation and causes opening of the valve in the area surrounding the tubular conduit.

As noted above, the application of the pressure differential to a relatively large area of the diaphragm causes the response of the check valve to be substantially instantaneous. The foregoing instantaneous action and positive sealing are further enhanced by making the outer surface associated with said extension of tapered configuration. More specifically, when the valve opens the outer edge of the perforation moves toward the smaller portion of the tapered configuration. Thus not only is there a tendency for the edge portions of the perforation to move away from the outer surface associated with the extension of the second conduit means but also the outer tapered surface in effect recedes from the edge portion of the perforation, thereby providing an accelerated response as the valve opens. Conversely when the valve closes, in response to the application of pressure differential to the diaphragm, not only does the edge portion of the perforation tend to move toward the extension but the tapered surface in effect also moves toward the edge portion of the perforation at the same time to thereby provide an accelerated sealing action. In addition, the greater the pressure differential applied to the diaphragm, the more the edge portion of the perforation will move toward the larger portion of the tapered configuration to thereby provide more positive sealing. It will also be noted that when there is fluid flow through said perforation, the greater the pressure differential the more the perforation will open, because the diaphragm is made of a resilient rubber compound, to thereby maintain the pressure drop through the check valve at a minimum. Since the fluid flow is of a relatively high velocity past the surfaces which provide sealing, the fluid flow will itself provide a self cleaning action to prevent the accumulation of impurities on the sealing surfaces.

The improved valve is preferably incorporated as a part of the fluid storage container but may be an entity in itself.

In FIG. 1 a vacuum tank or reservoir 10 is shown mounted on the firewall 11 of vehicle 12 by bracket 13. A first conduit 14 effects communication between engine intake manifold 15 and nipple 16 (FIG. 2) of check valve 17 mounted on the wall 18 of vacuum tank 10. A second conduit 19 effects communication between nipple 20 of check valve 17 and vacuum wiper motor 21 which is also mounted on the firewall 11 of the vehicle. The purpose of vacuum tank 10 is to provide a relatively constant supply of vacuum for operation of the motor 21 irrespective of fluctuations in the engine intake manifold vacuum. As is well understood in the art, whenever wiper motor 21 is placed in operation by the manipulation of a suitable control, not shown, which is mechanically linked to the wiper motor by cable 22, motor lever 23 will oscillate and such oscillation will be transmitted to wipers 24 through links 25, attached to drive lever 23, crankarms 26, and wiper arms 27.

Whenever the vacuum of the engine intake manifold 15 is greater than the vacuum in tank 10, the check valve or self-sealing valve 17 will assume the position shown in FIG. 3 wherein circular diaphragm 28 is bowed upwardly to cause perforation 29 to permit communication between the inside of said tank and conduit 14 through chamber 30. Diaphragm 28 is preferably fabricated from a corrosion resistant synthetic rubber compound. The outer edge of diaphragm 28 is clamped between rim 31 of die cast housing 32 and wall 18 of the tank to seal chamber 30 against leakage. The foregoing clamping is effected by peening the end 33 of extension 34 of nipple 20 over the sides 35 of an aperture, not numbered, in anchor member 36, which may be made of spring steel. The outer edges 37 of anchor member 36 lie directly under rim 31 of housing 32 to thereby cause said wall 18 and outer edge of said diaphragm 38 to be clamped between it and rim 31. It is to be noted that the housing 32 and nipples 16 and 20 are die cast as an integral unit. Spring steel anchor member 36 causes the foregoing assembly to be insensitive to temperature changes by compensating for temperature induced dimensional variations of the assembly.

Under certain extreme conditions, as for example, heating of the diaphragm 28, the diaphragm may tend to vibrate thereby producing an audible sound. To prevent this from occurring, projection 32' is provided which extends downwardly from the upper wall of the housing 32. Projection 32' engages the diaphragm 28 to dampen the vibrators when the diaphragm is in the open position as shown in FIG. 3.

It will be noted that elongated apertures 39 (FIG. 4) and apertures 40 are provided in wall 18 and anchor member 36, respectively, to permit the communication between conduit 14 and the inside of tank 10 whenever diaphragm 28 is in the position shown in FIG. 3.

It will be noted that nipple extension 34, which extends through chamber 30, is in direct communication with both the inside of tank 10 and nipple 20 leading to conduit 19. Therefore the vacuum within tank 10 is always communicated to conduit 19. As noted above, whenever the vacuum within conduit 14 is greater than the vacuum within tank 10, diaphragm 28 will assume the position shown in FIG. 3 wherein the edge portions of perforation 29 are forced out of engagement with tapered seat 41 snugly mounted on the outer surface of nipple extension or conduit means 34. The air flow is upwardly around tapered seat 41, which may be of frusto-conical configuration, and past the edge portions of perforation 29 which are otherwise used for sealing against reverse flow. The passage of air in the foregoing path produces a self cleaning action which prevents impurities from depositing either on the valve seat 41 or on the edges of perforation 29 which provide sealing engagement therewith. Seat 41 may be a plastic insert which is located as shown, or in lieu thereof extension 34 may itself be formed of tapered or frusto-conical configuration. Furthermore, the taper of seat 41 may be curved rather than straight, if desired.

Whenever the vacuum within tank 10 exceeds the vacuum in conduit 14 so that a check valve action is necessary to prevent dissipation of vacuum from tank 10 into conduit 14, diaphragm 28 is pulled downwardly to the position shown in FIG. 2 wherein the major portion of diaphragm 28 inwardly of rim 31 comes to rest on wall 18 and the edge portion outwardly of perforation 29 effects sealing engagement with the outer surface of seat 41. Perforation 29 is of smaller diameter than valve seat 41 with which it is associated. This causes the edge portions of perforation 29 to assume the position shown in FIG. 2. Since the diameter of seat 41 increases toward the bottom thereof, the greater the pressure differential tending to effect sealing the greater will be the sealing action. It is also to be noted that the sealing is effected at an accelerated rate not only because the edge portions of perforation 29 are pulled into contact with seat 41 but also because the seat 41 increases in diameter toward the bottom thereof, thereby in effect tending to minimize the time required for sealing engagement to be effected. Conversely, when the pressure differential on diaphragm 28 is reversed so that it moves to the position of FIG. 3 from the position of FIG. 2, the response is substantially instantaneous because not only do the edge portions of perforation 29 tend to move away from seat 41 but also because seat 41 is tapered upwardly so that in effect the seat tends to recede from the sides of aperture 29 as the latter moves upwardly. The foregoing tapered construction of seat 41 thus provides an accelerated response both when the diaphragm is moving to the closed position shown in FIG. 2 and when it is moving to the open position shown in FIG. 3. It is to be also noted that while the diameter of perforation 29 must be smaller than certain portions of the diameter of seat 41 to effect sealing, other portions of seat 41 and/or the outer surface of nipple extension 34 may be of smaller diameter than perforation 29 to thereby enhance fluid flow through the check valve by minimizing the restriction to such flow.

In FIG. 5 a modified embodiment of the construction of FIGS. 2–4 is shown, the only difference being that conduit extension 34 does not mount a valve seat 41 of tapered configuration. In this embodiment diaphragm 28, shown in the sealing position in solid lines and in open position in dotted lines, provides its sealing action by causing the edge portions surrounding perforation 29 to seat directly on the outer cylindrical surface 42 of nipple extension 34.

In FIG. 6 a further modified embodiment of the present invention is shown. This embodiment differs from the preceding embodiments in that the improved check valve structure is separate from tank 10 and therefore can be used as an entity by itself wherever check valve action is required. More specifically, the rim 31 of housing 32 in conjunction with member 43 is caused to anchor the outer edge of diaphragm 28 and the outer edge of plate 44 therebetween when rivets 45 clamp said elements together. The end of nipple extension 46 is formed into flange 47 to support the inner edge of plate 44 between it and the edge of seat 41. Apertures 39 are provided in plate 44. Whenever diaphragm 28 is deflected to a position wherein it unseats from valve seat 41, communication will be effected between chambers 30 and 48 through apertures 39. Aside from the fact that the valve structure shown in FIG. 6 is an entity by itself, it operates in the same manner as described above relative to the embodiments of FIGS. 2–4. Certain of the numerals applied to FIG. 6 correspond to the same elements of structure depicted in FIGS. 2–4 and are intended to relate to identical structure.

In all of the embodiments of the invention it will be noted that the pressure differential applied to diaphragm 28 is effective over substantially the entire surface thereof for effecting either a sealing action or an opening action. Therefore the response of the check valve structure is substantially instantaneous. It will further be noted that in all embodiments of the invention, the greater the pressure differential tending to cause perforation 29 to move away from seat 41, the greater will be the clearance therebetween to therefore cause a minimum pressure drop to be produced across the check valve. Furthermore, since diaphragm 28 is fabricated from a rubber compound, aperture 29 may stretch and therefore increase in size when subjected to high pressure differentials tending to open the valve to therefore enhance fluid flow through the valve by minimizing the restriction to said flow. Thus in essence the check valve adjusts its opening in direct proportion to the pressure applied thereto.

While the above description has generally referred to the use of a check valve with a vacuum source, it will readily be appreciated that by coupling nipple 20 to a source of positive pressure, the check valve construction of the present invention can equally well be used with such a source. Furthermore, it will readily be appreciated that the present invention can be used with any fluid pressure source whether it be gaseous or liquid.

While preferred embodiments of the present invention have been disclosed, it will readily be understood that the present invention is not limited thereto but may be otherwise embodied.

I claim:
1. A check valve construction comprising a housing, said housing including first and second chambers separated by a diaphragm, said diaphragm being stretchable and of elastomeric material, a first nipple on said housing for effecting communication between a vacuum source and said housing, a second nipple on said housing for effecting communication between said housing and a device adapted to be actuated by vacuum, said first chamber in said housing being in communication with said first nipple, an extension on said second nipple passing through said first chamber and in communication with said second chamber, said extension having a first diameter, a perforation in said diaphragm with an inner edge portion surrounding said extension for selective sealing engagement therewith, said perforation having a second diameter which is less than said first diameter, said diaphragm deflecting in a first direction in response to the vacuum in said first chamber being greater than the vacuum in said second chamber to thereby cause said edge portion of said perforation to move from sealing engagement with said extension to permit communication between said first chamber and said second chamber, said diaphragm deflecting in a second direction in response to the vacuum in said second chamber being greater than the vacuum in said first chamber to cause the edge portion of said perforation to move into sealing engagement with said extension to thereby prevent communication between said first chamber and said second chamber and apertured, relatively rigid wall means adjacent said diaphragm for limiting deflection of said diaphragm in said second direcion to assure maintenance of sealing engagement of said diaphragm with said extension.

2. A check valve construction comprising a housing, a chamber in said housing, first and second conduit means in communication with said housing, said first conduit means being in communcation with said chamber and said second conduit means including an outer portion with a first diameter forming a cylindrical valve seat extending through said chamber, a diaphragm with first and second sides, a perforation with an edge portion in said diaphragm, said diaphragm being stretchable and of elastomeric material, said perforation being of a second diameter which is less than said first diameter, said edge portion of said perforation surrounding said outer portion of said second conduit means, means for fixedly mounting a peripheral portion of said diaphragm on said housing, said first side of said diaphragm being subjected to the pressure in said chamber and said second side of said diaphragm being subjected to the pressure in said second conduit means, said edge portion of said perforation being adapted to selectively effect sealing engagement with said valve seat of said second conduit means, said diaphragm deflecting in a first direction in response to the pressure differential on said first and second faces of said diaphragm being in a first direction to thereby cause said edge portion of said perforation to move from sealing engagement with said valve seat of said second conduit means to permit communication between said first and second conduit means through said chamber, said diaphragm deflecting in a second direction in response to the pressure differential on said first and second faces being in a second direction which is opposite to said first direction to thereby cause said edge portion of said perforation to move into sealing engagement with said valve seat of said second conduit means to thereby prevent communication between said first and second conduit means through said chamber and relatively rigid, apertured wall means adjacent said diaphragm in a plane parallel thereto for limiting deflection of said diaphragm in said second direction to assure maintenance of sealing engagement of said diaphragm with said valve seat.

3. A valve structure as set forth in claim 2 wherein said valve seat is tapered and has a smaller portion and a larger portion and wherein said first face of said diaphragm faces said smaller portion and said second face of said diaphragm faces said larger portion.

References Cited by the Examiner

UNITED STATES PATENTS

| 465,013 | 12/91 | Bourdil | 137—525.3 XR |
| 2,236,477 | 3/41 | Fuchs | 137—525 |
| 2,351,547 | 6/44 | Schaal | 137—525 XR |
| 2,374,989 | 5/45 | Funk | 137—525 |
| 2,462,189 | 2/49 | Hess | 137—525 XR |

FOREIGN PATENTS 568,856   4/45   Great Britain.

WILLIAM F. O'DEA, *Primary Examiner*.